(12) United States Patent
Andreopoulos et al.

(10) Patent No.: US 11,172,210 B2
(45) Date of Patent: Nov. 9, 2021

(54) PROCESSING IMAGE DATA

(71) Applicant: iSize Limited, London (GB)

(72) Inventors: Ioannis Andreopoulos, London (GB); Srdjan Grce, London (GB)

(73) Assignee: ISIZE LIMITED, London (GB)

(*) Notice: Subject to any disclaimer, the term of this patent is extended or adjusted under 35 U.S.C. 154(b) by 0 days.

(21) Appl. No.: 17/039,526

(22) Filed: Sep. 30, 2020

(65) Prior Publication Data

US 2021/0211739 A1 Jul. 8, 2021

Related U.S. Application Data

(60) Provisional application No. 62/957,286, filed on Jan. 5, 2020, provisional application No. 62/962,971, filed (Continued)

(51) Int. Cl.
*H04N 19/176* (2014.01)
*H04N 19/147* (2014.01)
(Continued)

(52) U.S. Cl.
CPC ........... *H04N 19/176* (2014.11); *H04N 19/12* (2014.11); *H04N 19/124* (2014.11);
(Continued)

(58) Field of Classification Search
CPC .... H04N 19/85; H04N 19/182; H04N 19/184; H04N 19/44; H04N 19/12; H04N 19/136
See application file for complete search history.

(56) References Cited

U.S. PATENT DOCUMENTS

2009/0304071 A1 12/2009 Shi et al.
2010/0119156 A1 5/2010 Noguchi et al.
(Continued)

FOREIGN PATENT DOCUMENTS

CN 110248190 A 9/2019
EP 1605362 A1 12/2005
(Continued)

OTHER PUBLICATIONS

Xu et al. "CNN-based rate-distortion modeling for H. 265/HEVC." 2017 IEEE Visual Communications and Image Processing (VCIP). IEEE, 2017.
(Continued)

*Primary Examiner* — Tracy Y. Li
(74) *Attorney, Agent, or Firm* — Patterson + Sheridan LLP

(57) ABSTRACT

A method of processing image data at a server is provided. Image data from one or more images is received at a preprocessing network comprising a set of inter-connected learnable weights, the weights being dependent upon one or more display settings of a display device. The image data is processed using the preprocessing network to generate a plurality of output pixel representations corresponding to different display settings of the display device. The plurality of output pixel representations are encoded to generate a plurality of encoded bitstreams. At least one selected bitstream is transmitted from the server to the display device, wherein the at least one encoded bitstream is selected on the basis of the one or more display settings of the display device.

15 Claims, 8 Drawing Sheets

Related U.S. Application Data on Jan. 18, 2020, provisional application No. 62/962,970, filed on Jan. 18, 2020, provisional application No. 62/971,994, filed on Feb. 9, 2020, provisional application No. 63/012,339, filed on Apr. 20, 2020, provisional application No. 63/023,883, filed on May 13, 2020.

(51) Int. Cl.

| | | |
|---|---|---|
| H04N 19/172 | (2014.01) | |
| H04N 19/61 | (2014.01) | |
| H04N 19/12 | (2014.01) | |
| H04N 19/136 | (2014.01) | |
| H04N 19/182 | (2014.01) | |
| H04N 19/184 | (2014.01) | |
| H04N 19/44 | (2014.01) | |
| H04N 19/85 | (2014.01) | |
| H04N 19/126 | (2014.01) | |
| H04N 19/65 | (2014.01) | |
| H04N 19/86 | (2014.01) | |
| H04N 21/2662 | (2011.01) | |
| H04N 19/124 | (2014.01) | |
| H04N 19/154 | (2014.01) | |

(52) U.S. Cl.
CPC ......... *H04N 19/126* (2014.11); *H04N 19/136* (2014.11); *H04N 19/147* (2014.11); *H04N 19/154* (2014.11); *H04N 19/172* (2014.11); *H04N 19/182* (2014.11); *H04N 19/184* (2014.11); *H04N 19/44* (2014.11); *H04N 19/61* (2014.11); *H04N 19/65* (2014.11); *H04N 19/85* (2014.11); *H04N 19/86* (2014.11); *H04N 21/2662* (2013.01)

(56) References Cited

U.S. PATENT DOCUMENTS

| | | | |
|---|---|---|---|
| 2012/0033040 A1 | 2/2012 | Pahalawatta et al. | |
| 2015/0042878 A1 | 2/2015 | Jeon et al. | |
| 2016/0105698 A1* | 4/2016 | Tang | H04N 21/2187 725/14 |
| 2017/0347026 A1 | 11/2017 | Hannuksela | |
| 2018/0131953 A1 | 5/2018 | Wang et al. | |
| 2018/0174052 A1* | 6/2018 | Rippel | G06N 3/08 |
| 2020/0314985 A1* | 10/2020 | Degris | G06N 3/084 |
| 2020/0337537 A1* | 10/2020 | Hirasawa | A61B 1/273 |

FOREIGN PATENT DOCUMENTS

| | | |
|---|---|---|
| EP | 3493149 A1 | 6/2019 |
| EP | 3584676 A1 | 12/2019 |
| GB | 2548749 A | 9/2017 |
| WO | 9962265 A1 | 12/1999 |
| WO | 2014018050 A1 | 1/2014 |
| WO | 2016132152 A1 | 8/2016 |
| WO | 2018229490 A1 | 12/2018 |
| WO | 2019009449 A1 | 1/2019 |
| WO | 2019009489 A1 | 1/2019 |
| WO | 2019182703 A1 | 9/2019 |
| WO | 2019197712 A1 | 10/2019 |
| WO | 2019220095 A1 | 11/2019 |

OTHER PUBLICATIONS

Zhu et al., "Spatiotemporal visual saliency guided perceptual high efficiency video coding with neural network." Neurocomputing 275 (2018): 511-522.
Bourtsoulatze et al., "Deep video precoding," IEEE Trans. on Circ. and Syst. for Video Technol., to appear in 2020.
Ronneberger et al., U-net: Convolutional networks for biomedical image segmentation, International Conference on Medical image computing and computer-assisted intervention. Springer, Cham, 2015.
Varghese et al. "e-DASH: Modelling an energy-aware DASH player." 2017 IEEE 18th International Symposium on A World of Wireless, Proc. IEEE Mobile and Multimedia Networks (WoWMoM), 2017.
Massouh, et al. "Experimental study on luminance preprocessing for energy-aware HTTP-based mobile video streaming." Proc. IEEE 2014 5th European Workshop on Visual Information Processing (EUVIP).
Hu et al., "Energy-aware video streaming on smartphones." Proc. IEEE Conf. on Computer Communications (Infocom). IEEE, 2015.
Almowuena, et al. "Energy-aware and bandwidth-efficient hybrid video streaming over mobile networks." IEEE Trans. on Multimedia 18.1 (2015): 102-115.
Mehrabi, et al. "Energy-aware QoE and backhaul traffic optimization in green edge adaptive mobile video streaming." IEEE Trans. on Green Communications and Networking 3.3 (2019): 828-839.
European Search Report for European Patent Application No. EP20199342, dated Oct. 16, 2020, 4 pages.
European Search Report for European Patent Application No. EP20199345, dated Nov. 18, 2020, 6 pages.
Anonymous: "Autoencoder", Wikipedia, retrieved from the Internet: URL:https://en.wikipedia.org/w/index.php?title=Autoencoder &direction=prev&oldid=930342212, retrieved Mar. 5, 2020, 13 pages.
European Search Report for European Patent Application No. EP20199344, dated Oct. 16, 2020, 4 pages.
European Search Report for European Patent Application No. EP201993447 dated Oct. 23, 2020, 4 pages.
European Search Report for European Patent Application No. EP20199349, dated Oct. 23, 2020, 6 pages.
Dong et al., "Adaptive downsampling for high-definition video coding." IEEE Transactions on Circuits and Systems for Video Technology 24.3 (2014): 480-488.
Shen et al., "Down-sampling based video coding using super-resolution technique." IEEE Transactions on Circuits and Systems for Video Technology21.6 (2011): 755-765.
Dar et al., "Improving low bit-rate video coding using spatio-temporal down-scaling." arXiv preprint arXiv:1404.4026 (2014).
Nguyen et al., Adaptive downsampling/upsampling for better video compression at low bit rate. Circuits and Systems, 2008. ISCAS 2008. IEEE International Symposium on. IEEE, 2008.
Hinton et al. "Reducing the dimensionality of data with neural networks." science313.5786 (2006): 504-507.
Van Den Oord et al. "Conditional image generation with pixelcnn decoders." Advances in Neural Information Processing Systems. 2016.
Theis et al., "Lossy image compression with compressive autoencoders." arXiv preprint arXiv:1703.00395(2017).
Wu et al., "Video Compression through Image Interpolation." arXiv preprint arXiv:1804.06919 (2018).
Rippel et al., "Real-time adaptive image compression." arXiv preprint arXiv:1705.05823 (2017).
Golub et al., Matrix computations. vol. 3. JHU Press, 2012.
Timofte et al., "NTIRE 2017 challenge on single image super-resolution: Methods and results," Proc. Comp. Vis. and Pattern Recognition Workshops (CVPRW), 2017 IEEE Conf. on Comp. Vis. and Pattern Recognition, CVPR, IEEE, 2017, https://goo.gl/TQRT7E.
Lim et al. "Enhanced deep residual networks for single image super-resolution," Proc. Comp. Vis. and Pattern Recognition Workshops (CVPRW), 2017 IEEE Conf. on Comp. Vis. and Pattern Recogn., CVPR, IEEE, 2017, https://goo.gl/PDSTiV.
Dong, et al., "Accelerating the super-resolution convolutional neural network," Proc. 2016 IEEE Conf. on Comp. Vis. and Pattern Recognition, CVPR, IEEE, 2016, https://goo.gl/Qa1UmX.Dong, Jie, and Yan Ye. "Adaptive downsampling for high-definition video coding." IEEE Transactions on Circuits and Systems for Video Technology 24.3 (2014):480-488.

(56) References Cited

OTHER PUBLICATIONS

Dong et al., "Learning a deep convolutional network for image super-resolution," Proc. ECCV (2014) 184-199.
Dong et al., "Image super-resolution using deep convolutional networks," IEEE TPAMI 38(2) (2015) 295-307.
Yang et al., "Fast direct super-resolution by simple functions," Proc. ICCV. (2013) 561-568.
Dong et al., Accelerating the Super-Resolution Convolutional Neural Network, Proc. ICCV (2016).
Han et al., "Deep compression: Compressing deep neural networks with pruning, trained quantization and huffman coding," arXiv preprint arXiv: 1510.00149 (2015).
Han, et al., "Learning both weights and connections for efficient neural network," Advances in neural information processing systems. 2015.
Iandola, et al., "SqueezeNet: AlexNet-level accuracy with 50x fewer parameters and< 0.5 MB model size," arXiv preprint arXiv:1602.07360 (2016).
LeCun et al., "Deep learning," Nature, vol. 521, No. 7553, 2015.
Abadi et al., "TensorFlow: A system for large-scale machine learning," Proc. 12th USENIX Symp. on Oper. Syst. Des. and Implem. (OSDI), Savannah, Georgia, USA. 2016.
Simonyan et al., "Two-stream convolutional networks for action recognition in videos," Proc. Advances in Neural Inf. Process. Syst., NIPS, 2014.
Sze, et al., "Hardware for machine learning: Challenges and opportunities," arXiv preprint, arXiv:1612.07625, 2016.
Zhang, et al., "Optimizing FPGA-based accelerator design for deep convolutional neural networks," Proc. ACM/SIGDA Int. Symp. Field-Prog. Gate Arr., FPGA. ACM, 2015.
Chen, et al., "DianNao: A small-footprint high-throughput accelerator for ubiquitous machine-learning," Proc. ASPLOS, 2014.
Shafiee et al., "ISAAC: A convolutional neural network accelerator with in-situ analog arithmetic in crossbars," Proc. EEE Int. Symp. on Comp. Archit., ISCA, 2016.
Chi, et al., "PRIME: A novel processing-in-memory architecture for neural network computation in ReRAM-based main memory," Proc. IEEE Int. Symp. on Comp. Archit., ISCA, 2016.
Park, et al., "A 1.93TOPS/W scalable deep learning/inference processor with tetra-parallel MIMD architecture for big-data applications," Proc. ISSCC, 2015.
Cavigelli, et al., "Origami: A convolutional network accelerator," Proc. GLVLSI, 2015.
Mathieu, et al., "Fast training of convolutional networks through FFTs," Proc. ICLR, 2014.
Yang, et al., "Designing energy-efficient convolutional neural networks using energy-aware pruning," arXiv preprint arXiv:1611.05128, 2016.
Hsu, "For sale: deep learning," IEEE Spectrum, vol. 53, No. 8, pp. 12-13, Aug. 2016.
Han, et al., "Deep compression: Compressing deep neural network with pruning, trained quantization and Huffman coding," Proc. ICLR, 2016.
Chen et al., "Eyeriss: An energy-efficient reconfigurable accelerator for deep convolutional neural networks," Proc. ISSCC, 2016.
Courbariaux et al., "Binarynet: Training deep neural networks with weights and activations constrained to +1 or −1," arXiv preprint, arXiv:1602.02830, 2016.
Deng et al., "Image aesthetic assessment: An experimental survey," IEEE Signal Processing Magazine, 34(4), pp. 80-106, 2017.
Yu et al., "Multi-scale context aggregation by dilated convolutions," arXiv preprint arXiv:1511.07122, 2015.
Goodfellow et al., "Generative adversarial nets," in Advances in neural information processing systems, 2014.
Salimans et al., "Improved techniques for training gans," in Advances in neural information processing systems, 2016.
Mao et al., "Least squares generative adversarial networks," in Proceedings of the IEEE International Conference on Computer Vision, 2017.
Jolicoeur-Martineau, "The relativistic discriminator: a key element missing from standard GAN," arXiv preprint arXiv:1807.00734, 2018.
Arjovsky et al., Wasserstein gan, arXiv preprint arXiv:1701.07875, 2017.
Gulrajani et al., "Improved training of wasserstein gans," in Advances in neural information processing systems, 2017.
Mroueh et al., "Fisher gan," in Advances in Neural Information Processing Systems, 2017.
Suehring et al., HHI AVC reference code repository, online at the HHI website. https://avc.hhi.fraunhofer.de/.
Bjontegaard, "Calculation of average PSNR differences between RD-curves," VCEG-M33 (2001).
Wang et al., "SSIM-motivated rate-distortion optimization for video coding." IEEE Transactions on Circuits and Systems for Video Technology 22.4 (2011): 516-529.
Li, et al. "Delay-power-rate-distortion optimization of video representations for dynamic adaptive streaming." IEEE Transactions on Circuits and Systems for Video Technology 28.7 (2017): 1648-1664.
Helmrich, et al. "Perceptually Optimized Bit-Allocation and Associated Distortion Measure for Block-Based Image or Video Coding." 2019 Data Compression Conference (DCC). IEEE, 2019.

* cited by examiner

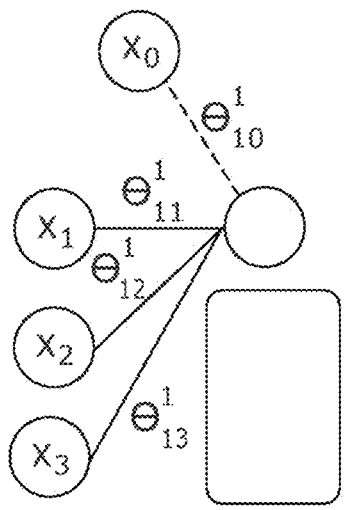

$$g(\Theta_{10}^1 x_0 + \Theta_{11}^1 x_1 + \Theta_{12}^1 x_2 + \Theta_{13}^1 x_3)$$

$\Theta_{13}^1$ means:

1 (superscript) - mapping from layer 1
1 - mapping to node 1 in layer 2 (L+1)
3 - mapping from node 3 in layer 1 (L)

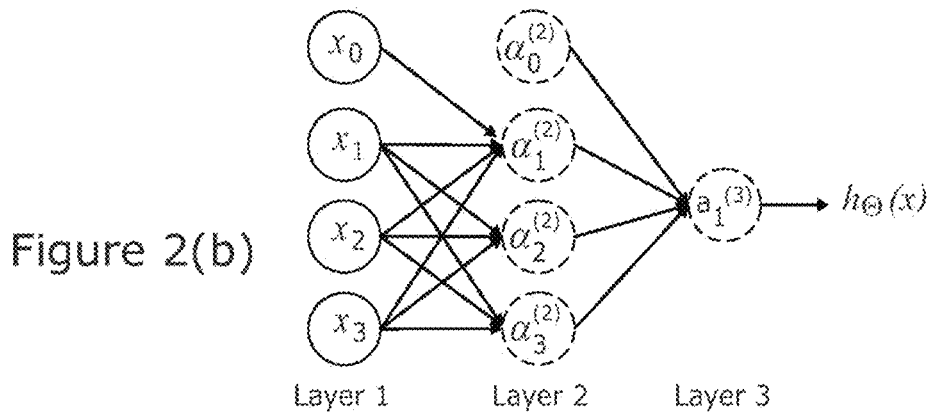

Figure 2(b)

$$a_1^{(2)} = g(\Theta_{10}^{(1)} x_0 + \Theta_{11}^{(1)} x_1 + \Theta_{12}^{(1)} x_2 + \Theta_{13}^{(1)} x_3)$$

$$a_2^{(2)} = g(\Theta_{20}^{(1)} x_0 + \Theta_{21}^{(1)} x_1 + \Theta_{22}^{(1)} x_2 + \Theta_{23}^{(1)} x_3)$$

$$a_3^{(2)} = g(\Theta_{30}^{(1)} x_0 + \Theta_{31}^{(1)} x_1 + \Theta_{32}^{(1)} x_2 + \Theta_{33}^{(1)} x_3)$$

$$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$$

PROCESSING IMAGE DATA

CROSS-REFERENCE TO RELATED APPLICATIONS

This application claims the benefit of U.S. Provisional Patent Application Nos. 62/957,286, filed on Jan. 5, 2020, 62/962,971, filed on Jan. 18, 2020, 62/962,970, filed on Jan. 18, 2020, 62/971,994, filed on Feb. 9, 2020, 63/012,339, filed on Apr. 20, 2020, and 63/023,883, filed on May 13, 2020, the entire contents of each of which is incorporated herein by reference.

INTRODUCTION

Technical Field

The present disclosure concerns computer-implemented methods of processing image data. The disclosure is particularly, but not exclusively, applicable where the image data is video data.

BACKGROUND

When visual data (e.g. a set of images, video, 3D data, stereoscopic image data, computer graphics, animation, etc.) is sent over a dedicated IP packet switched or circuit-switched connection, a range of streaming and encoding recipes must be selected in order to ensure the best possible use of the available bandwidth. To achieve this, (i) the encoder must be tuned to provide for some bitrate control mechanism and (ii) the streaming server must provide for the means to control or switch the stream when the bandwidth of the connection does not suffice for the transmitted data. Methods for tackling bitrate control include constant bitrate (CBR) encoding, variable bitrate (VBR) encoding, or solutions based on a video buffer verifier (VBV) model [9]-[12], such as QVBR CABR, capped-CRF, etc. These solutions control the parameters of the adaptive quantization and intra-prediction or inter-prediction per segment of visual data [9]-[12] in order to provide the best possible reconstruction accuracy for the decoded visual datasets (e.g., images or video) at the smallest number of bits. Methods for tackling stream adaptation include the DASH, HLS and CMAF protocols—namely, for the case of adaptive streaming over HTTP. Under adaptive streaming, the adaptation includes the selection of a number of encoding resolutions, bitrates and encoding templates (which were discussed previously) via a so-called manifest file. Therefore, the encoding and streaming process is bound to change the frequency content of the input video and introduce (ideally) imperceptible or (hopefully) controllable quality loss in return for bitrate savings. This quality loss is measured with a range of quality metrics, ranging from low-level signal-to-noise ratio metrics, all the way to complex mixtures of expert metrics that capture higher-level elements of human visual attention and perception. One such metric that is now well-recognized by the video community and the Video Quality Experts Group (VQEG) is the Video Multi-method Assessment Fusion (VMAF), proposed by Netflix. There has been a lot of work in VMAF to make it a "self-interpretable" metric: values close to 100 (e.g. 93 or higher) mean that the compressed content is visually indistinguishable from the original, while low values (e.g. below 70) mean that the compressed content has significant loss of quality in comparison to the original. It has been reported [Ozer, Streaming Media Mag., "Buyers' Guide to Video Quality Metrics", Mar. 29, 2019] that a difference of around 6 points in VMAF corresponds to the so-called Just-Noticeable Difference (JND), i.e. quality difference that will be noticed by the viewer.

The process of encoding and decoding visual data with a standard encoder always requires the use of linear filters for the production of the decoded (and often upscaled) content that the viewer sees on their device. This can lead to uncontrolled quality fluctuation in the recovery and playback of visual data, or poor-quality in general. The viewers most often experience this when they happen to be in an area with poor 4G/Wi-Fi signal strength, where the high-bitrate encoding of a 4K video stream will quickly get switched to a much lower-bitrate/lower-resolution encoding, which the decoder and video player will keep on upscaling to the display device's resolution while the viewer continues watching.

Another factor that affects visual quality significantly is the settings of the decoding device's display or projector (if projection to an external surface or to a mountable or head-mounted display is used). Devices like mobile phones, tablets, monitors, televisions or projectors involve energy-saving modes where the display is deliberately "dimmed" in order to save power [13][14]. This dimming process tends to include, amongst others, adjustment of screen or projector contrast, brightness and gamma parameters. Such dimming may be adjusted via environmental light via a dedicated sensor, or may be tunable by the viewer or by an external controller, e.g. to reduce eye fatigue [15]. Adaptive streaming proposals have explored energy-driven adaptation, e.g. adjusting transmission parameters or encoding resolutions and frame rates [16]-[21], in order to reduce energy consumption at the client device in a proactive or reactive manner. For example, the work of Massouh et al. [17] proposes luminance preprocessing at the server side in order to reduce power at the client side. The method of Massouh et al. proposes to preprocess the video at the server side in order to reduce its brightness/contrast, thus allowing for energy-consumption reduction at the client side regardless of the energy-saving or dimming settings of the client. However, this reduces the visual quality of the displayed video. In addition, it is attempting to do this experimentally, i.e., via some pre-determined and non-learnable settings.

Technical solutions to the problem of how to improve visual quality (whilst ensuring efficient operation of encoders) can be grouped into three categories.

The first type of approaches consists of solutions attempting device-based enhancement, i.e. advancing the state-of-the-art in intelligent video post-processing at the video player Several of these products are already in the market, including SoC solutions embedded within the latest 8K televisions. While there have been some advances in this domain [21]-[23], this category of solutions is currently static, may be limited by the stringent complexity constraints and power consumption limitations of consumer electronics, and does not exploit knowledge or estimates of the client device dimming conditions in order to post-process the decoded video signal dynamically. In addition, it does not optimize such dynamic post-processing according to perceptual metrics that quantify video quality at the display in comparison to the source content, and does not use learnable approaches that train the post-processing parameters based on data. Further, it is not combined with bitrate reduction from the server that can optimize for energy-saving and display-dimming settings—all such approaches at the client side operate without being able to increase the compression efficiency of the server-side encoding of the visual data.

A second family of approaches consists of the development of bespoke image and video encoders, typically based on deep neural networks [24]-[28]. This deviates from encoding, stream-packaging and stream-transport standards and creates bespoke formats, so has the disadvantage of requiring bespoke transport mechanisms and bespoke decoders in the client devices. In addition, in the 50+ years video encoding has been developed most opportunities for improving gain in different situations have been taken, thereby making the current state-of-the-art in spatio-temporal prediction and encoding very difficult to outperform with neural-network solutions that are designed from scratch and learn from data. In addition, all such approaches focus on compression and signal-to-noise ratio (or mean squared error or structural similarity) metrics to quantify distortion, and do not consider the decoding device's dimming settings or how to reverse them to improve quality at the client side and save encoding bitrate while preserving the client device's energy consumption.

The third family of methods comprises perceptual optimization of existing standards-based encoders by using perceptual metrics during encoding. Here, the challenges are that: i) the required tuning is severely constrained by the need for compliance to the utilized standard; ii) many of the proposed solutions tend to be limited to focus-of-attention models or shallow learning methods with limited capacity, e.g. assuming that the human gaze is focusing on particular areas of the frame (for instance, in a conversational video we tend to look at the speaker(s), not the background) or using some hand-crafted filters to enhance image slices or groups of image macroblocks prior to encoding; iii) such methods tend to require multiple encoding passes, thereby increasing complexity; and iv) no consideration is given to the decoding device's display (or projector) settings—i.e, known settings or estimates of those are not exploited in order to improve quality of the displayed video at the decoder side and/or save encoding bitrate for the same quality, as measured objectively by quality metrics or subjectively by human scorers.

Because of these issues, known designs are very tightly coupled to the specific encoder implementation and ignore the actual decoding display settings. Redesigning them for a new encoder and/or new standard, e.g., from HEVC to VP9 encoding, and/or a wide variety of display configurations, can require substantial effort.

The present disclosure seeks to solve or mitigate some or all of these above-mentioned problems. Alternatively and/or additionally, aspects of the present disclosure seek to provide improved image and video encoding and decoding methods, and in particular methods that can be used in combination with existing image and video codec frameworks.

SUMMARY

In accordance with a first aspect of the disclosure there is provided a method of processing image data at a server, the method comprising: receiving, at a preprocessing network comprising a set of inter-connected learnable weights, image data from one or more images, wherein the weights of the preprocessing network are dependent upon one or more display settings of a display device; processing the image data using the preprocessing network to generate a plurality of output pixel representations, where different output pixel representations in the plurality of output pixel representations correspond to different display settings of the display device; encoding the plurality of output pixel representations to generate a plurality of encoded bitstreams; and transmitting at least one selected encoded bitstream from the server to the display device, wherein the at least one encoded bitstream is selected from the plurality of encoded bitstreams on the basis of the one or more display settings of the display device.

The selecting may be performed at the server or at the display device (or both). In embodiments where the selecting of the at least one encoded bitstream is performed at the server, the selecting may be performed in response to the server receiving information from the display device. Such information may comprise an indication of the display settings of the display device, for example. In embodiments where the selecting is performed at the display device, the server receives an indication of the selection from the display device, and transmits the selected bitstream accordingly.

In embodiments, the one or more display settings are indicative of an energy-saving state of the display device. For example, the one or more display settings may indicate whether or not the display device is in an energy-saving mode. Different display settings may be used by the display device depending on whether or not the display device is in the energy-saving mode.

The term "display device" as used herein will be understood to include one or multiple physical devices. The display device, or "client device", can receive encoded image data, decode the encoded image data, and generate an image for display. In some examples, the decoder functionality is provided separately from the display (or projector) functionality, e.g. on different physical devices. In other examples, a single physical device (e.g. a mobile telephone) can both decode encoded bitstreams and display the decoded data on a screen that is part of the device. In some examples, the display device is operable to generate a display output for display on another physical device, e.g. a monitor.

The preprocessing network may be referred to as an "energy-saving precoder" since it precedes the actual image or video encoder in the image processing pipeline, and aims to optimize the visual quality after decoding and display of image data optionally with dimmed settings, e.g. due to energy-saving features being enabled at the client device. This can be done prior to streaming, or during live streaming/transmission of the encoded video, of even in very-low latency video conferencing applications.

By using a preprocessing network conditioned on the display settings of the display device, the quality of playback at the display device may be improved, by pseudo-reversing the effects of the display device's dimming settings. In particular, an image signal can be enhanced (or amplified) prior to encoding if it is determined that the display device is in an energy-saving mode. This can be achieved without requiring (or imposing) any control on how the display device adjusts its energy-saving or display dimming settings, or indeed how it switches between adaptive streaming modes (e.g. in HLS/DASH or CMAF streaming). Further, a visual quality of the displayed images may be improved for a given encoding bitrate (e.g. as scored by quality metrics) by taking into account client-side display and/or dimming settings. The improvement in visual quality can be achieved whilst causing a minimal increase in energy consumption at the display device, compared to the energy consumption associated with displaying the original video/image without the use of the preprocessing network. Fidelity of the subsequently encoded, decoded and displayed image data to the original image data may also be improved through use of the methods described herein. Moreover, encoding bitrate can be saved while maintaining a given visual quality and not increasing the energy consumption of the client device. Further, by allowing a switching between different encoded bitstreams, different device display settings can be accommodated, as can bitrate fluctuations.

By preprocessing (and/or postprocessing) the visual data in accordance with the described methods, the display quality of such data under client screen or projector dimming options, wireless transceiver low-power modes and/or other energy-saving modes of visual data clients may be improved. The transmission bitrate for compressed versions of the visual data sent from the server to the client can also be reduced. Therefore, the described methods comprise techniques to construct reduced bitstream representations that maximize the perceptual quality at the client under energy-saving modes.

The described methods include technical solutions that are adaptive and/or learnable based on data and may utilize a standard encoder with a certain encoding recipe. Preprocessing (and/or postprocessing) adjustments may be made according to dynamic estimates (or measurements) of client-side display settings, as well as the dynamically-changing characteristics of the content of each image. The methods described herein also use cost functions to optimise the trade-off between signal fidelity and perceptual quality as assessed by human viewers watching the displayed image/video using display devices which support dimming features, e.g. to save energy and/or reduce eye fatigue.

The methods described herein include methods that exploits knowledge, or estimates, of the display settings of the display device to tune the parameters and/or operations of preprocessing of visual data prior to encoding on the server, and/or postprocessing of decoded visual data performed at the client. An overall technical question addressed can be abstracted as: how to optimally preprocess and/or postprocess visual data in conjunction with dynamic adaptation between bitstreams made available by the server, and dynamic energy-saving options at the client, in order to make delivery and playback of visual data as efficient as possible in terms of bitrate-quality-energy performance metrics? This question may be especially relevant where, beyond dimming the display or projector luminance/contrast and other parameters, the client device can resize the content in space and time (e.g. increase/decrease spatial resolution or frame rate) with its existing filters, and/or where perceptual quality is measured with the latest advances in perceptual quality metrics from the literature, e.g., using VMAF or similar metrics.

In embodiments, a given output pixel representation of the plurality of output pixel representations is encoded into both a first and a second encoded bitstream, wherein the first and the second encoded bitstreams correspond to different spatial and/or temporal resolutions and/or different bitrates. As such, the server may generate a plurality of encoded bitstreams for a given display device setting (e.g. power-saving mode). The display device and/or the server can thus select between different spatial and/or temporal resolutions and/or different bitrates. For example, a first group of encoded bitstreams may include multiple spatial resolutions for a "power saving off" mode, and a second group of encoded bitstreams may include multiple spatial resolutions for a "power saving on" mode. This enables the efficiency of bitrate encoding to be improved.

Preferably, the selecting is performed on the basis of information provided by the display device. Such information may comprise data indicating a result of the selection (e.g. in embodiments where the selection is performed at the client-side), or may comprise display configuration data indicating the display settings of the display device (e.g. in embodiments where the selection is performed at the server-side).

In embodiments, a manifest file is sent to the display device, the manifest file comprising information indicating the plurality of encoded bitstreams. The term "manifest" indicates any description of a number of available bitstreams from a sender (e.g. server) to a receiver (e.g. client), and it is broader than the definition of "manifest" within DASH/HLS/CMAF standards. A manifest file is not sent to the display device in other embodiments.

Preferably, the one or more display settings are indicative of at least one of: whether the display device is plugged into an external power supply or is running on battery power; a battery power level of the display device; voltage or current levels measured or estimated while the display device is decoding and displaying image data; processor utilization levels of the display device; or a number of concurrent applications or execution threads running on the display device.

In embodiments, the one or more display settings comprise at least one of: brightness, contrast, gamma correction, refresh rate, flickering settings, bit depth, color space, color format, spatial resolution, or back-lighting settings of the display device. Other display settings may be used in alternative embodiments.

In embodiments, the preprocessing network comprises an artificial neural network including multiple layers having a convolutional architecture, with each layer being configured to receive the output of one or more previous layers.

Advantageously, the weights of the preprocessing network may be trained using end-to-end back-propagation of errors, the errors calculated using a cost function indicative of an estimated image error associated with displaying output pixel representations using the display device configured according to the one or more display settings.

In embodiments, the cost function is indicative of an estimate of at least one of: an image noise of the decoded output pixel representation; a bitrate to encode the output pixel representation; or a perceived quality of the decoded output pixel representation. As such, the preprocessing network may be used to reduce noise in the final displayed image(s), reduce the bitrate to encode the output pixel representation, and/or improve the visual quality of the final displayed image(s).

Advantageously, the cost function is formulated using an adversarial learning framework, in which the preprocessing network is encouraged to generate output pixel representations that reside on the natural image manifold. As such, the preprocessing network is trained to produce images which lie on the natural image manifold, and/or to avoid producing images which do not lie on the natural image manifold. This facilitates an improvement in user perception of the subsequently displayed image(s).

In embodiments, the outputs of each layer of the preprocessing network are passed through a non-linear parametric linear rectifier function, pReLU. Other non-linear functions may be used in other embodiments.

In embodiments, the preprocessing network comprises a dilation operator configured to expand a receptive field of a convolutional operation of a given layer of the preprocessing network. Increasing the receptive field allows for integration of larger global context.

In embodiments, processing the image data comprises using cost functions that estimate the fidelity of displayed image data at the display device to the received image data at the server, where the fidelity is estimated using one or more of: an elementwise loss function, such as mean squared error, MSE; a structural similarity index metric, SSIM; and a visual information fidelity metric, VIF. As such, the preprocessing network may be used to improve the fidelity of the final displayed image(s) relative to the original input image(s). In embodiments, the weights of the preprocessing network are trained in a manner that balances perceptual quality of the post-decoded output with fidelity to the original image.

In embodiments, processing the image data comprises using cost functions that estimate quality scores attributed to displayed image data at the display device from human viewers.

In accordance with another aspect of the disclosure there is provided a computer-implemented method of processing image data at a display device, the method comprising: receiving, from a server, information indicating a plurality of encoded bitstreams; transmitting, to the server, data indicating a selection of at least one encoded bitstream from the plurality of encoded bitstreams, wherein the selection is performed on the basis of one or more display settings of the display device; receiving the at least one selected encoded bitstream from the server; decoding the at least one encoded bitstream to generate image data representing one or more images; postprocessing, at a postprocessing network comprising a set of inter-connected learnable weights, the image data to obtain postprocessed image data, wherein the weights of the postprocessing network are dependent upon the one or more display settings of the display device; and displaying the postprocessed image data in accordance with the one or more display settings of the display device.

The postprocessing network may be configured in a similar manner to the preprocessing network described above. Alternatively, the postprocessing network may be configured differently to the preprocessing network. In particular, the architecture of the postprocessing network may be configured such that using the postprocessing network is less computationally expensive than using the preprocessing network. For example, the postprocessing network may comprise fewer layers than the preprocessing network. This can facilitate running the postprocessing network locally on the display/client device, which may have fewer processing resources and/or memory than the server.

In embodiments, the selection of the at least one encoded bitstream is performed automatically, on the basis of the display settings (e.g. whether or not the display device is in an energy-saving mode). In alternative embodiments, the selection is performed manually, e.g. in response to user input.

In embodiments, display configuration data indicative of the one or more display settings of the display device is transmitted to the server. The display configuration data is useable by the server to preprocess the image data using a preprocessing network such as that described herein.

In accordance with another aspect of the disclosure, there is provided a computer-implemented method for preprocessing visual data prior to encoding or post-processing visual data after decoding. The utilized visual data comprise one or multiple of: image, video, multidimensional point cloud data, stereoscopic data, multispectral, hyperspectral or infrared images or, computer graphics, animation or computer game data. The preprocessing stage may happen on a server, prior to the encoding of the visual data with any encoder. The post-processing stage may happen on a client, which receives the compressed bitstream corresponding to one or more versions of the preprocessed & encoded visual data, and decodes them to pass them to the postprocessor. The server can encode the optionally preprocessed visual data into multiple representations corresponding to multiple spatial and temporal resolutions, as well as multiple bitrates that represent the visual data with varying visual quality. This corresponds to multiple bitstreams, or multiple layers of bitstreams, which can be selected by the server or the client for transmission and reception, respectively. The selection may be done by posting all available options for spatio-temporal resolution and bitrate-quality encodings into a format that is interpretable by the server and the client. This format may be in the form of a so-called manifest file or post file or list file, but it can also be made available in other forms. Other formats and/or methods of communicating data between the server and the client and/or making decisions about which encodings to use may be used in alternative embodiments.

The encoding and decoding can take place with any third-party standard, open-source or proprietary encoder and decoder. Once the visual representation is reproduced at the client side (after decoding), it can optionally be post-processed. In embodiments, post-processing can take place in-tandem with preprocessing. However, embodiments can also include only one of the two, that is, only preprocessing or only post-processing. The aim of preprocessing and postprocessing is to adjust the visual data representation prior to and after decoding, respectively, in order to alleviate the effects of client-side energy-saving options or screen or projector dimming settings. Such settings include, but are not limited to, gamma, brightness, contrast, color saturation, etc. The effects of such settings are alleviated by preprocessing and postprocessing (or either of them), when the client produces the visual representation in a form that is as visually faithful as possible to the input visual representation when displayed or projected by the client at any energy-saving or display dimming settings. Visual fidelity may be assessed against the original visual data displayed under optimal conditions at the server side and by using one or more of objective metrics, such as Peak Signal to Noise Ratio (PSNR), Visual Information Fidelity (VIF), and several others. It can also be assessed via human observers rating the visual quality of the reproduced visual representation in comparison to the server-side one, or in comparison to an external reference. The client can measure its energy-saving and display dimming settings in order to use them for the post-processing, and also periodically communicate them to the server. In addition, embodiments may have two or more communicating entities, e.g., computer servers, mobile devices, etc., which host both a client and a server, in order to allow for bidirectional exchange of visual data.

Both the preprocessing at the server and the post-processing stage at the client may comprise a set of weights inter-connected in a network (termed as "pre/post-processing network") that ingests: (i) the input visual data samples; (ii) knowledge or estimates of the client device's display (or projector) settings, or knowledge, or estimates, of the client's power or energy-saving state. These settings can be measurements or estimates of the average settings for a time interval of a video (or any duration), or can be provided per scene, per individual frame, or even per segment of an individual set of visual data, such as a segment of an image or video frame, or a segment of point cloud data or infrared or multispectral data.

In embodiments, the pre/post-processing network is configured to convert input visual data samples to output visual data representations by applying the network weights on the input and accumulating the result of the output product and summation between weights and subsets of input visual data. The network weights, as well as offset or bias terms used for sets of one or more weights, are conditioned on the aforementioned client device power and/or display (or projector) dimming settings. The weights are updated via a training process that uses end-to-end back-propagation of errors computed on the outputs to each group of weights, biases and offsets based on the network connections. The output errors are computed via a cost function that estimates the visual data after encoding, decoding and emulating or simulating the effects of displaying (or projecting) the output reconstructed visual data representation at the client.

In embodiments, the utilized cost function comprises multiple terms that, for the output after decoding, express: noise estimates for the visual data, or functions that estimate the rate to encode the visual data, or estimates, functions expressing the perceived quality of the client output from human viewers, or any combinations of these terms. The pre/post-processing network and cost-function components are trained or refined for any number of iterations prior to deployment (offline) based on training data or, optionally, have their training fine-tuned for any number of iterations based on data obtained during the pre/post-processing network and encoder-decoder-display operation during deployment (online).

In embodiments, the pre/post-processing network can optionally increase or decrease the spatial or temporal resolution of the visual data in accordance to a given upscaling or downscaling ratio. The ratio can be an integer or fractional number and also includes ratio of 1 (unity) that corresponds to no resolution change. For example, considering visual data corresponding to: an image, ratio of 2/3 and input image resolution equal to 1080p (1920×1080 pixels, with each pixel comprising 3 color values), this setup would correspond to the output being an image of 720p resolution (1280×720 pixels). Similarly, ratio 2/3 in frame rate of a video sequence and original frame rate of 30 fps would correspond to the output being at 20 fps.

In terms of the structure of the pre/post-processing network connections, the network can optionally be structured in a cascaded structure of layers of activations. Each activation in each layer can be connected to any subset (or the entirety) of activations of the next layer, or a subsequent layer by a function determined by the layer weights. In addition, the network can optionally comprise a single or multiple layers of a convolutional architecture, with each layer taking the outputs of the previous layer and implementing a filtering process via them that realizes the mathematical operation of convolution. In addition, some or all the outputs of each layer can optionally be passed through a non-linear parametric linear rectifier function (pReLU) or other non-linear functions that include, but are not limited to, variations of the sigmoid function or any variation of functions that produce values based on threshold criteria.

In embodiments, some or all of the convolutional layers of the pre/post-processing architecture can include implementations of dilation operators that expand the receptive field of the convolutional operation per layer. In addition, the training of the preprocessing network weights can be done with the addition of regularization methods that control the network capacity, via hard or soft constraints or normalization techniques on the layer weights or activations that reduces the generalization error but not the training error.

In embodiments, the utilized cost functions express the fidelity to the input images based on reference-based quality metrics that include several metrics or functions or estimates, such as mean squared error (MSE), structural similarity index metric (SSIM) and others.

In terms of the provided client side energy-saving or display or projection parameters, these can include: brightness, contrast, gamma correction, refresh rate, flickering (or filtering) settings, bit depth, color space, color format, spatial resolution, and back-lighting settings (if existing), whether the device is plugged in an external power supply or is running on battery power, the battery power level, voltage or current levels measured or estimated while the device is decoding and displaying visual data, CPU or graphics processing unit(s) utilization levels, number of concurrent applications or execution threads running in the device's task manager or power manager. Moreover, the utilized encoder is a standards-based image or video encoder such as an ISO JPEG or ISO MPEG standard encoder, or a proprietary or royalty-free encoder, such as, but not limited to, an AOMedia encoder.

Furthermore, either before encoding or after decoding, high resolution and low resolution versions of the visual data can be provided and the low resolution version is upscaled and optimized to improve and/or match quality or rate of the high resolution version using the disclosed invention as the means to achieve this. In the optional case of this being applied after decoding, this corresponds to a component on the decoder (client side) that applies such processing after the external decoder has provided the decoded visual data.

In terms of the training process across time, the training of the pre/post-processing network weights, and any adjustment to the cost functions can be performed at frequent or infrequent intervals, with new measurements from quality, bitrate, perceptual quality scores from humans, encoded image data from external image or video encoders, and updated estimates or measurements for energy-saving and/or display dimming settings at the client, and the updated weights and cost functions being used for this purpose.

The methods of processing image data described herein may be performed on a batch of video data, e.g. a complete video file for a movie or the like, or on a stream of video data.

The methods described herein include a mechanism for selecting amongst multiple compressed bitstreams from a remote server in an adaptive manner. The adaptive selection mechanism can be controlled by either the server or the client, and it is designed to optionally switch between bitstreams according to the energy-saving modes of the client, and optionally post-process the decoded visual data prior to display.

The disclosed preprocessing network (or precoder) comprises a linear or non-linear system trained by gradient-descent methods and back-propagation. The system can comprise multiple convolutional layers with non-linearities and can include dilated convolutional layers and multiple cost functions, which are used to train the weights of the layers using back propagation. The weights of the layers, their connection and non-linearities, and the associated cost functions used for the training can be conditioned on the image or video encoder settings and the "dimming" settings of the display device (or estimates of such settings). The disclosed postprocessing network may be configured in a similar manner to the preprocessing network. It will be understood that, while in some embodiments both a preprocessing network (at the server) and a postprocessing network (at the client) are used, in other embodiments one or both of the preprocessing network and the postprocessing network are not used.

In accordance with another aspect of the disclosure there is provided a computing device comprising: a processor; and a memory, wherein the computing device is arranged to perform using the processor any of the methods of processing image data described above.

In accordance with another aspect of the disclosure there is provided a computer program product arranged, when executed on a computing device comprising a process or memory, to perform any of the methods of processing image data described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIGS. 2(a) to 2(c) are schematic diagrams showing a preprocessing or postprocessing network in accordance with embodiments;

DETAILED DESCRIPTION

Embodiments of the present disclosure are now described.

Figure 1:
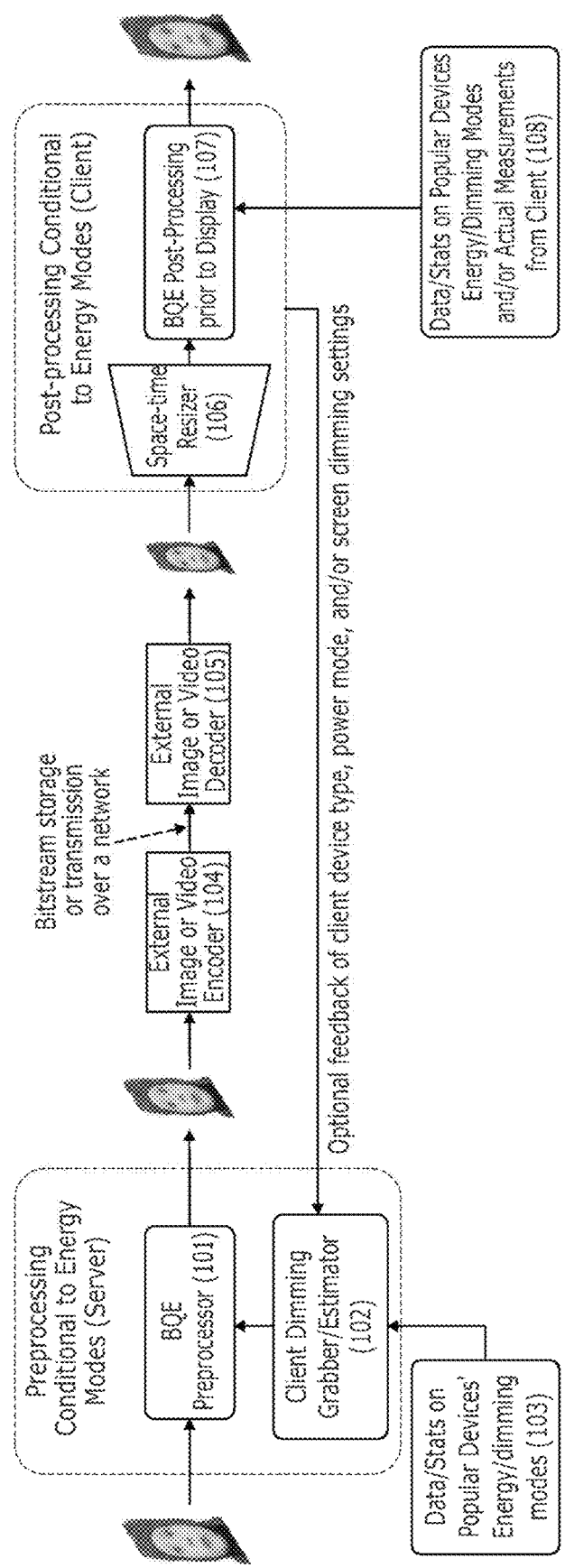
FIG. 1 is a schematic diagram of a method of processing image data in accordance with embodiments.

FIG. 1 is a schematic diagram showing a method of processing image data, according to embodiments. The method involves preprocessing and postprocessing of visual data conditional to knowledge or estimates of a client device's dimming settings (and optional resizing). In the embodiments shown in FIG. 1, the image data (or visual data) corresponds to a series of video frames. However, it will be understood that other forms of visual data may be used in other embodiments.

The server part of the example shown in FIG. 1 includes a preprocessor component, which consists of: a BQE (bitrate/quality/energy-oriented) preprocessor 101, a Client Dimming Grabber/Estimator 102 and a component that collects data and statistics on energy/dimming modes of popular devices 103) Component 102 can optionally receive feedback of client device type, power mode and screen dimming settings. This can be achieved, for example, via a JavaScript component running on a client web browser page or a client video player, which will send real-time information on whether the device is on a power-saving mode, and what are the mode's settings, or it is plugged into a charger. Other mechanisms include, but are not limited to, a player application on the client side that has permissions to read the detailed status of the display and power modes from the device. If such feedback is not available from the client, as shown in component 103 of FIG. 1, offline estimates and statistics can be used for the power modes and display dimming settings of popular devices, e.g. mobile phones, tablets, smart TVs, etc. Embodiments are applicable to batch processing, i.e processing a group of visual data together without delay constraints (e.g. an entire video sequence), as well as to stream processing, i.e. processing only a limited subset of a stream of visual data, or even a select subset of a single segment of visual data (e.g. a section of an image), due to delay or buffering constraints.

As shown in FIG. 1, any external visual data encoder and decoder can be used, which, in the case of the depicted embodiments, comprise an external encoder and decoder (components 104 and 105) The received visual data bitstream at the client is decoded and post-processed via the decoder and space-time resizer, components 105 and 106 of FIG. 1, respectively. The BQE post-processing component 107 processes the decoded and optionally-resized visual data prior to sending it to the display or visual projector of the client. The BQE post-processing component can access data and statistics on the client's energy-saving and/or screen-dimming settings, or can access to a database of stored measurements or settings, which may also contain such settings from other popular client devices, such as mobile phones, tablets, etc. This is shown in component 108 of FIG. 1. The client can measure its own energy-saving settings or screen dimming settings at least one during the transmission and reception of the visual data, and can communicate such measurements to the server, by sending them to component 102.

Figure 2C:
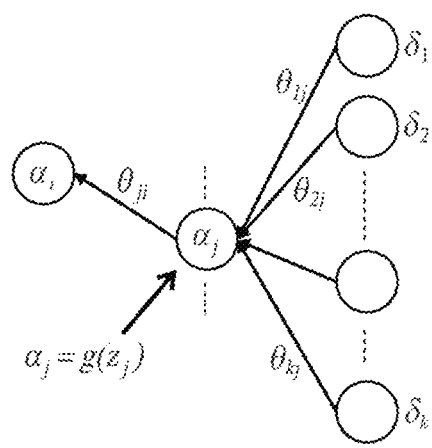

In embodiments, the BQE preprocessor 101 and the BQE post-processor 107 can comprise any combination of learnable weights locally or globally connected in a network with a non-linear activation function. An example of such weights is shown in FIG. 2(a) and an associated example in FIG. 2(b) showcases global connectivity between weights and inputs. As such FIG. 2(a) shows a combination of inputs $x_0, \ldots, x_3$ with weight coefficients $\Theta$ and linear or non-linear activation function g( ), and FIG. 2(b) is a schematic diagram showing layers of interconnected activations and weights, forming an artificial neural network with global connectivity. An example of local connectivity between weight $\theta_{ji}$ connecting input $\alpha_i$ and output $\alpha_j$ is shown in FIG. 2(c) for one of the computations of a 2D dilated convolution [1]. The activation function applied to produce output $\alpha_j$ is shown by $g(z_j)$, and it can comprise a parametric ReLU (pReLU) function. FIG. 2(c) also shows connections from output $\alpha_j$ to the next-layer outputs via weights $\theta_{1i}, \theta_{2i}, \ldots, \theta_{ki}$. It also illustrates how back-propagation training can feed back errors from outputs back to inputs. As such, FIG. 2(c) shows schematically the back-propagation of errors $\delta$ from an intermediate layer (right side of FIG. 2(c)) to the previous intermediate layer using gradient descent. The illustrated errors are indicated by $\delta_1, \delta_2, \ldots, \delta_k$, and they are computed from errors of subsequent layers, which, in turn, are computed eventually from errors between network outputs and training data outputs that are known a-priori.

Figure 3:
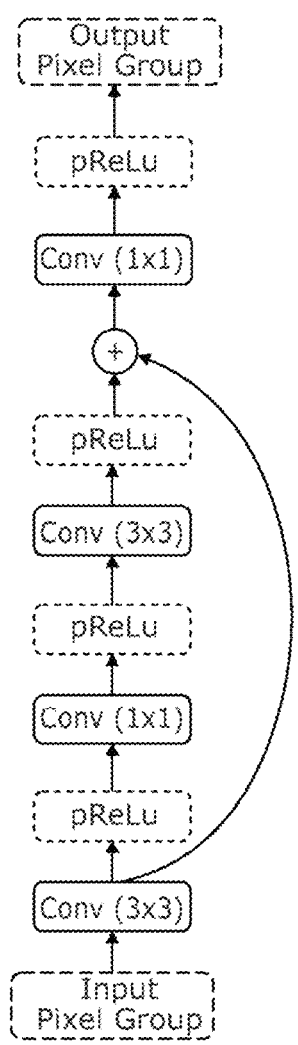
FIG. 3 is a schematic diagram showing a preprocessing or postprocessing network in accordance with embodiments.

The network of weights and inputs-outputs can form a multi-layer network for the preprocessor and post-processor components 101 and 107 of FIG. 1. This is termed as pre/post-processing network. An example of such a multi-layer pre/post-processing network is shown in FIG. 3, which depicts schematically a cascade of conditional convolutional and parametric ReLU (pReLU) layers mapping input pixel groups to transformed output pixel groups. All layers can receive encoding and energy-saving settings (or estimates) as input, along with the representation from the previous layer. There is also the possibility for skip connections between some layers as illustrated by the connection arrow from the left-most Conv (3×3) layer and the summation point shown in FIG. 3. In other words, the embodiments shown in FIG. 3 consist of a series of conditional convolutional (Conv) layers and elementwise parametric ReLU (pReLU) layers of weights and activations. Each conditional convolution takes the output of the preceding layer as input (with the first layer receiving the image as input), along with intended (or estimated) settings for the client side display or projection, encoded as a numerical representation. For image precoding for an image codec, these settings can include but are not limited to (i) the provided or estimated decoding device's display settings include at least one of the following: brightness, contrast, gamma correction, refresh rate, flickering (or filtering) settings, bit depth, color space, color format, spatial resolution, or back-lighting settings (if existing); (ii) the provided or estimated decoding device's power or energy-saving settings include at least one of the following: whether the device is plugged in an external power supply or is running on battery power, the battery power level, voltage or current levels measured or estimated while the device is decoding and displaying video, CPU or graphics processing unit(s) utilization levels, number of concurrent applications or execution threads running in the device's task manager or power manager.

Figure 4:
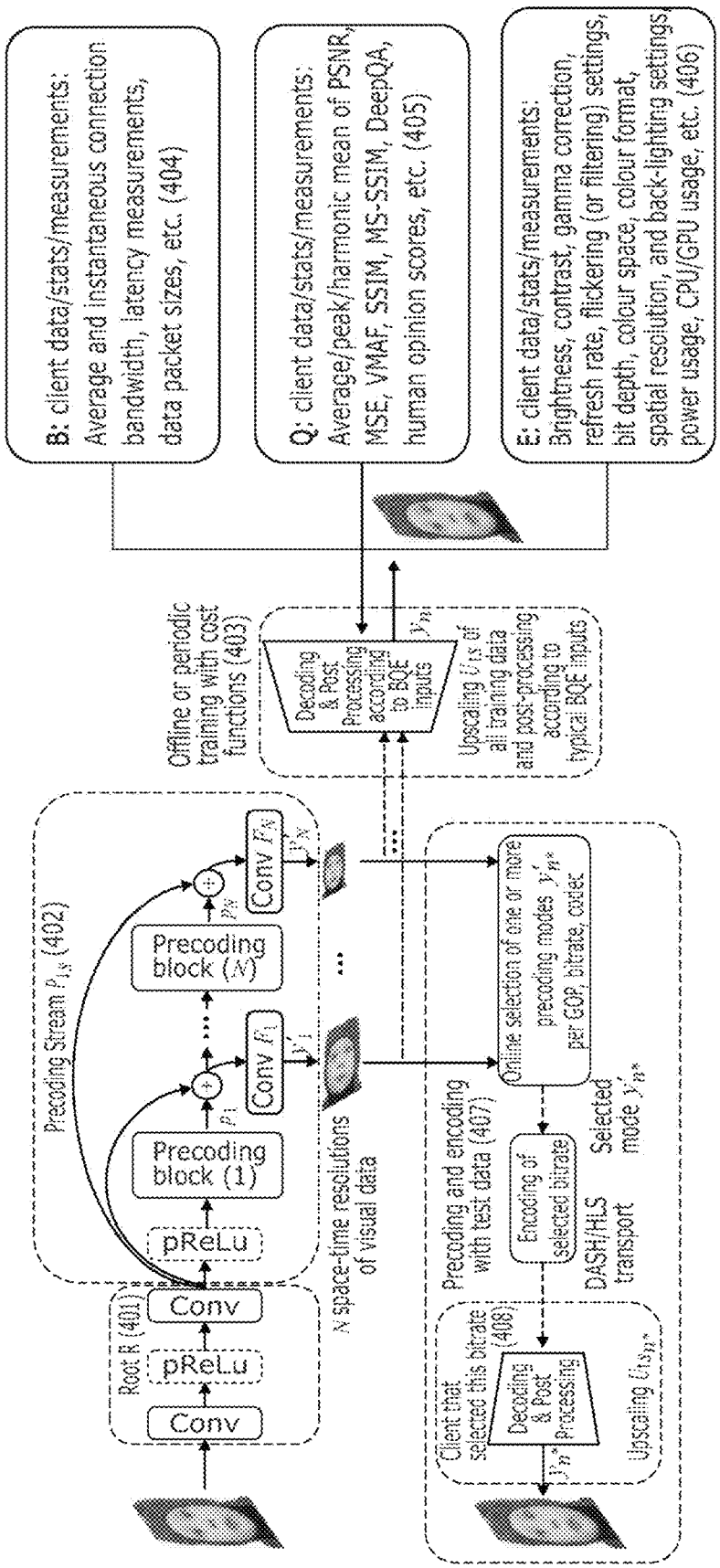
FIG. 4 is a schematic diagram showing a convolutional layer of a preprocessing or postprocessing network in accordance with embodiments.

An example framework of the training and deployment of the pre/post-processing network is shown in FIG. 4, which depicts schematically Bitrate (B), Quality (Q) and Energy (E) driven optimization of preprocessing and post-processing, with details on an example of the design of the pre/post-processing networks, the training process and the encoding and test process. The example design comprises a root part 401 followed by a number of precoding blocks (e.g. as described with reference to FIG. 3), which comprise the Precoding Stream 402. These can also be used to optionally resize the input in space or time domains, towards creating N space-time resolutions of the input visual data. These multiple representations for the visual data can be selected when encoding and streaming the compressed results to the client. The offline or periodic training module with multiple cost functions is given in module 403. It receives inputs for bitrate (B) (component 404), quality (Q) (component 405) and energy (E) (component 406) Training takes place by upscaling all training data and then using multiple loss functions corresponding to losses of component Q 405. The values of these loss functions are backpropagated into the components 402 and 401, and adjustments to the weights of these components are made that are conditional to the inputs from component (E) 406. Once the pre/post-processing component has been trained, it can be used for actual operation, as described above with reference to FIG. 1. The running of this component also allows for the selection of one or more space-time resolutions of the input visual data, which can also be placed on a manifest file Selection of resolution and bitrate to transmit the data from the server to the client can be made by either the server or the client. In addition, within the same computing system or hardware, or device, a client and a server can be present, which allow for simultaneous transmission and reception of visual data, akin to a two-way visual communication system.

The utilized losses used during training in the embodiments depicted in FIG. 1 and FIG. 4, which are based on component Q 405, will now be described.

The distortion loss $\mathcal{L}_D$ is derived as a function of a perceptual model, and optimized over the pre/post-processor weights, in order to match or maximize the perceptual quality of the post-decoded output visual data $\hat{x}$ over the original input visual data x. The perceptual model is a parametric model that estimates the perceptual quality of the post-decoded output $\hat{x}$. The perceptual model can be configured as an artificial neural network with weights and activation functions and connectivity (e.g. as described with reference to FIGS. 2(*a*)-2(*c*) and FIG. 3. This perceptual model produces a reference or non-reference based score for quality; reference based scores compare the quality of $\hat{x}$ to x, whereas non-reference based scores produce a blind image quality assessment of $\hat{x}$. The perceptual model can optionally approximate non-differentiable perceptual score functions, including VIF, ADM2 and VMAF, with continuous differentiable functions. The perceptual model can also be trained to output human rater scores, including mean opinion score (MOS) values. The perceptual model can either be pre-trained or trained iteratively with the deep conditional precoding by minimizing perceptual loss $\mathcal{L}_P$ and $\mathcal{L}_D$ alternately or sequentially respectively. The perceptual loss $\mathcal{L}_P$ is a function of the difference between the reference (human-rater) quality scores and model-predicted quality scores over a range of inputs. The distortion loss $\mathcal{L}_D$ can thus be defined between $\hat{x}$ and x, as a linear or non-linear function of the intermediate activations of selected layers of the perceptual model, up to the output reference or non-reference based scores Additionally, in order to ensure faithful reconstruction of the input x, the distortion loss is combined with a pixel-wise loss directly between the input x and $\hat{x}$, such as mean absolute error (MAE) or mean squared error (MSE), and optionally a structural similarity loss, based on SSIM or MSSIM.

The noise loss component $\mathcal{L}_N$ is optimized over the pre/post-processor network weights and acts as a form of regularization, in order to further ensure that the pre/post-processor is trained such that the post-decoded and displayed output is a denoised representation of the input. Examples of noise include aliasing artefacts (e.g. jagging or ringing) introduced by downscaling in the preprocessor, as well as alleviating screen dimming effects introduced by the energy-saving modes of the client. An example of the noise loss component $\mathcal{L}_N$ is total variation denoising, which is effective at removing noise while preserving edges.

The rate loss $\mathcal{L}_R$ is an optional loss component that is optimized over the pre/post-processor network weights, in order to constrain the rate (number of bits or bitrate) of the utilized encoder that will encode the visual data. Alternatively, a given lossy JPEG, MPEG or AOMedia open encoder can be used to provide the actual rate and compressed representations as reference, which the rate loss can be trained to replicate. In both cases, training of the artificial neural network parameters can be performed with back-propagation and gradient descent methods.

In embodiments, the training can continue online and at any time during the system's operation. An example of this is when new images and quality scores are added into the system, or new forms of display dimming options and settings are added, which correspond to a new or updated form of dimming options, or new types of image content, e.g. cartoon images, images from computer games, virtual or augmented reality applications, etc. As such, the pre/post-processing network can adapt to new display options and/or image content.

To test the methods described herein with visual data corresponding to video, a utilized video codec fully-compliant to the H.264/AVC standard was used [29]. For the experiments, the same encoding parameters were used, which were: encoding frame rate of 50 frames-per-second; YUV encoding with zero U, V channels since the given images are monochrome (zero-valued UV channels consume minimal bitrate that is equal for both the precoder and the original video encoder); one I frame (only first); motion estimation search range +/−32 pixels and simplified UMHexagon search selected; 2 reference frames; and P prediction modes enabled (and B prediction modes enabled for QP-based control); NumberBFrames parameter set to 0 for rate-control version and NumberBFrames set to 3 for QP control version; CABAC is enabled and single-pass encoding is used; single-slice encoding (no rate sacrificed for error resilience); in the rate-control version, InitialQP=32 and all default rate control parameters of the encoder.cfg file of JM19.0 were enabled [29]; SourceBitDepthLuma/Chroma set to 12 bits and no use of rescaling or Q-Matrix.

Figure 5:
FIG. 5 is an example of video playback in accordance with embodiments.

The source material comprised standard 1080p 8-bit RGB resolution videos, but similar results have been obtained with visual image sequences or videos in full HD or ultra-HD resolution and any dynamic range for the input pixel representations. For the display dimming functionalities, standard brightness and contrast downconversions by 50% are applied when the utilized mobile, tablet, monitor or smart TV is set on energy-saving mode. These settings were communicated to a network preprocessing system as shown in FIG. 1. A conditional neural network architecture based on the examples shown in FIGS. 2(*a*)-2(*c*) and FIG. 3 was used to implement the preprocessing system at the server. The training and testing followed the embodiments described with reference to FIG. 4, and no post-processing at the client was applied in this example. An indicative visual result is shown in FIG. 5, where the left side of the video depicts the video without any adjustment done via the server-side preprocessing (and therefore appears dimmed and at lower visual quality), and the right side of the video depicts the video after the adjustments were done using an example embodiment of the disclosed system (thus compensating for screen dimming). As shown in FIG. 5, for the provided video sequence and under the knowledge or approximation of the encoding and display dimming parameters, the described methods offer significant quality improvement by pseudo-reversing the effects of encoding and dimming. This occurs for both types of encodings (bitrate and QP control). User controls are also presented at the bottom right of FIG. 5, where the user can select between the 'Energy Saving' ON and OFF options. Due to the use of the disclosed methods, the video on the right side FIG. 5 had the same visual quality as the encoded video when displayed in nominal conditions, i.e. without screen dimming, while also achieving 33% lower bitrate than the encoding of the video of the left side of FIG. 5. Beyond the presented embodiments, the methods described herein can be realized with the full range of options and adaptivity described in the previous examples, and all such options and their adaptations are covered by this disclosure.

Using as an option selective downscaling during the preprocessing process and allowing for a linear upscaling component at the client side after decoding (as presented in FIG. 1), the disclosed methods can shrink the input to 10%-40% of the frame size of the input frames, which means that the encoder processes a substantially smaller number of pixels and is therefore 2-6 times faster than the encoder of the full resolution infrared image sequence. This offers additional benefits in terms of increased energy autonomy for video monitoring under battery support, vehicle/mobile/airborne visual monitoring systems, etc.

Figure 6:
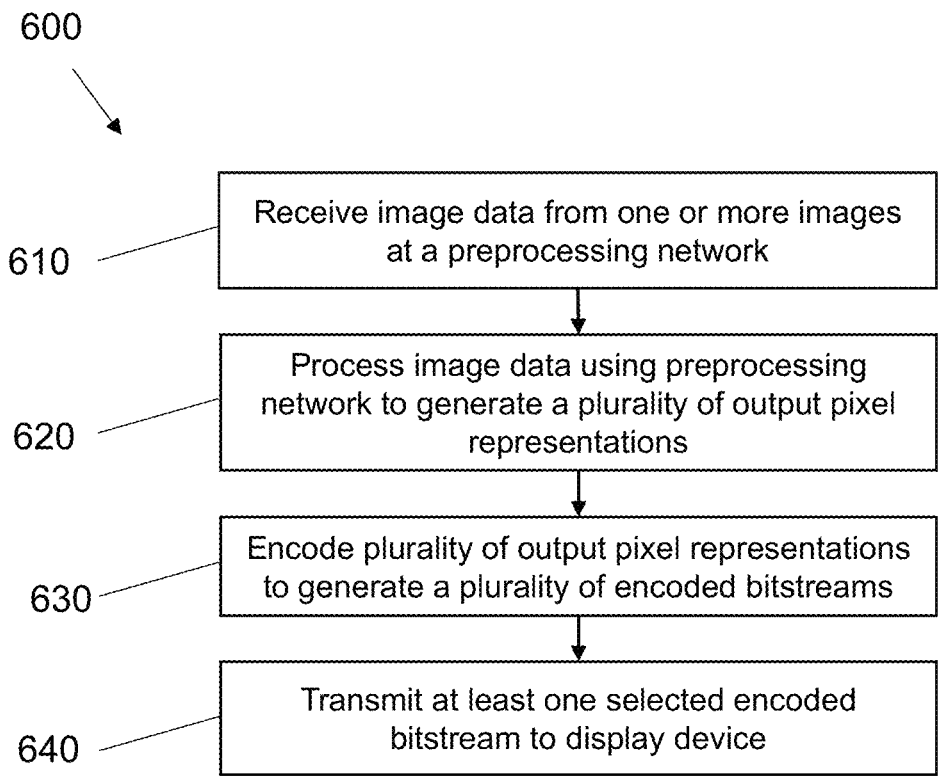
FIG. 6 is a flowchart showing the steps of a method of processing image data at a server in accordance with embodiments.

FIG. 6 shows a method 600 for preprocessing image data at a server. The method 600 may be performed by a computing device, according to embodiments. At item 610, image data from one or more images is received at a preprocessing network comprising a set of inter-connected learnable weights. The weights of the preprocessing network are dependent upon (i.e. conditioned on) one or more display settings of a display device. At item 620, the image data is processed using the preprocessing network (e.g. by applying the weights of the preprocessing network to the image data) to generate a plurality of output pixel representations. Different output pixel representations in the plurality of output pixel representations correspond to different display settings of the display device. The display settings may be associated with an energy-saving state of the display device, for example. At item 630, the plurality of output pixel representations is encoded to generate a plurality of encoded bitstreams. One or more encoded bitstreams may be produced for each of the output pixel representations. At item 640, at least one selected encoded bitstream is transmitted from the server to the display device. The at least one encoded bitstream is selected from the plurality of encoded bitstreams on the basis of the one or more display settings of the display device.

Figure 7:
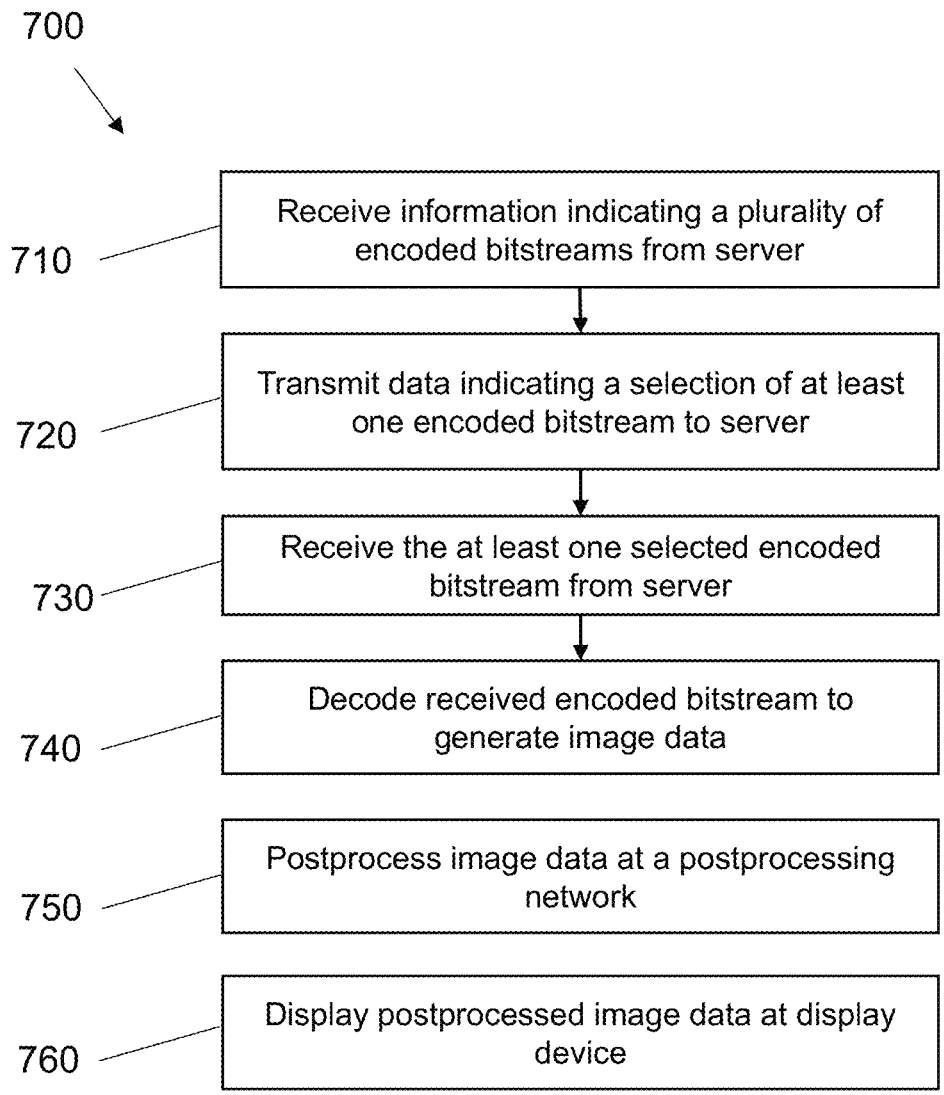
FIG. 7 is a flowchart showing the steps of a method of processing image data at a display device in accordance with embodiments.

FIG. 7 shows a method 700 of processing image data at a display device. The method 700 may be performed by a computing device, according to embodiments. The method 700 may be performed at least in part by hardware and/or software. At item 710, information indicating a plurality of encoded bitstreams is received from a server. At item 720, data indicating a selection of at least one encoded bitstream from the plurality of encoded bitstreams is transmitted to the server. The selection is performed on the basis of one or more display settings of the display device. At item 730, the at least one selected encoded bitstream is received from the server. As such, the transmitting of the data to the server at item 720 causes the server to select the at least one encoded bitstream indicated by the display device, and transmit the selected bitstream to the display device. At item 740, the at least one encoded bitstream is decoded to generate image data representing one or more images. At item 750, the image data is postprocessed at a postprocessing network comprising a set of inter-connected learnable weights to obtain postprocessed image data. The weights of the postprocessing network are dependent upon (i.e. conditioned on) the one or more display settings of the display device. At item 760, the postprocessed image data is displayed in accordance with the one or more display settings of the display device. In alternative embodiments, the image data is not postprocessed at the display device. Alternatively, the image data may be postprocessed but not using a trainable postprocessing network conditioned on the display settings of the display device.

Figure 8:
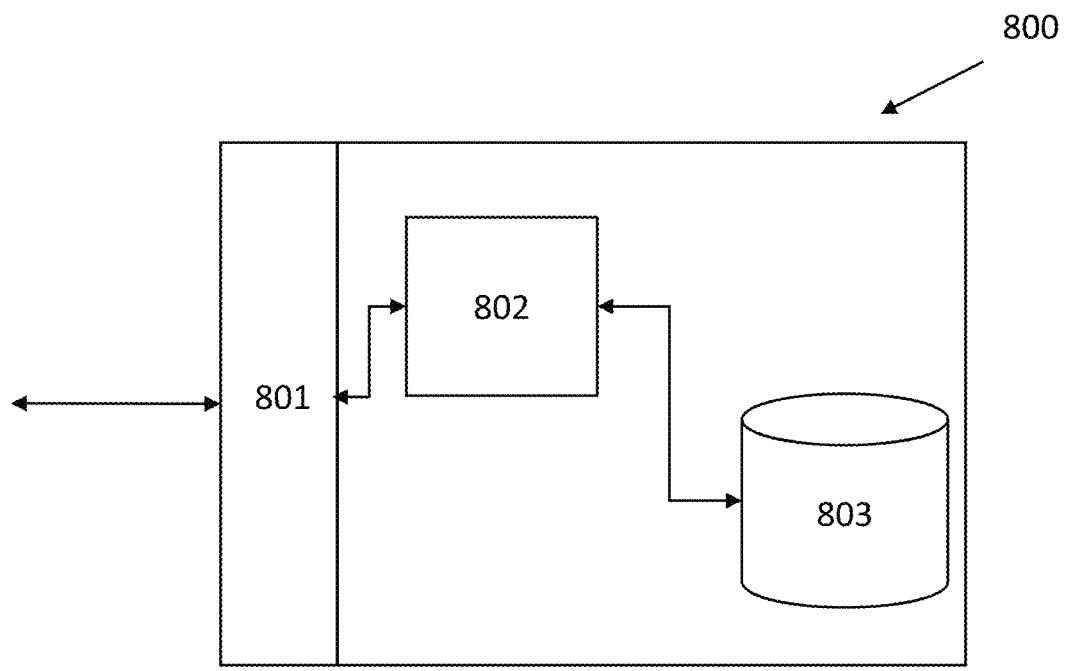
FIG. 8 is a schematic diagram of a computing device in accordance with embodiments.

Embodiments of the disclosure include the methods described above performed on a computing device, such as the computing device 800 shown in FIG. 8. The computing device 800 comprises a data interface 801, through which data can be sent or received, for example over a network. The computing device 800 further comprises a processor 802 in communication with the data interface 801, and memory 803 in communication with the processor 802. In this way, the computing device 800 can receive data, such as image data or video data, via the data interface 801, and the processor 802 can store the received data in the memory 803, and process it so as to perform the methods of described herein, including processing image data at a server and/or at a display device.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

Various measures (for example methods, apparatus, systems, computing devices and computer program products) are provided for preprocessing, encoding and transmitting visual data from a server to a client that receives, decodes and displays the transmitted visual data. The utilized pre-processing method comprises a set of weights that are configured to process and convert input samples of the visual data to output samples, with the weights of the preprocessing conditioned on values or estimates of one or both of: (i) the client's display (or projector) settings, (ii) the client's energy consumption or energy-saving settings. The preprocessing produces a single or a multitude of output sample representations according to multiple possible versions of these settings. The utilized encoding method produces a single or multiple encoded bitstreams for each of the aforementioned preprocessing's output sample representations, with the encoded versions optionally corresponding to multiple spatial or temporal resolutions, or multiple bitrates. One version or multiple versions of the aforementioned encoded bitstreams are transmitted from the server to the client using a computer network. The selection of which of the aforementioned encoded bitstreams to transmit is driven by information provided by the server or the client. The client decodes the received single or plurality of the transmitted bitstreams of the preprocessed and encoded visual data, optionally checking its utilized energy-saving modes for its data receiver and display (or projection) units. The client displays the decoded visual data according to its utilized energy-saving modes.

In embodiments, at least once during the transmission, the client sends to the server measurement values or estimates of the client's utilized data receiver modes or display modes corresponding to its aforementioned energy-saving modes.

In embodiments, at least once during the transmission, the client selects one or more versions of the encoded bitstreams from the server and communicates that selection to the server.

In embodiments, the client post-processes the decoded visual data prior to display, where the utilized post-processing method comprises a set of weights that are configured to process and convert decoded samples of the visual representation to display samples, with weights of the post-processing conditioned on values or estimates of one or both of: (i) the client's display (or projector) settings, (ii) the client's power or energy-saving settings.

In embodiments, the utilized visual data comprises one or multiple of: image, video, 3D point cloud data, stereoscopic data, multispectral, hyperspectral or infrared images or video, computer graphics, animation or computer game data.

In embodiments, the weights in the pre-processing or post-processing stages form a network of connections over a single or multiple connectivity layers, where each layer receives the outputs of the previous layers.

In embodiments, the outputs of each layer are processed with a non-linear function that outputs a non-zero value only if the value of its incoming data exceeds a certain specified threshold.

In embodiments, the layers of the preprocessing or post-processing stages include convolutional operators.

In embodiments, the layers or the preprocessing or post-processing stages include dilation operators that expand the receptive field of the operation per layer.

In embodiments, the weights of the preprocessing or post-processing network are trained with back-propagation methods.

In embodiments, the training is done with the addition of regularization methods that control the network capacity, via hard or soft constraints or normalization techniques on the layer weights or activations that reduces the generalization error.

In embodiments, cost functions are used that express the fidelity of the displayed visual datasets at the client side to the input visual datasets at the server when the latter datasets are displayed under normal screen conditions and without screen dimming, where the fidelity between these two datasets is quantified as a measurement that includes one or more of: elementwise loss functions such as mean squared error (MSE); a structural similarity index metric (SSIM); a visual information fidelity metric (VIF), for example from the published work of H. Sheikh and A. Bovik entitled "Image Information and Visual Quality"; a detail loss metric (DLM), for example from the published work of S. Li, F. Zhang, L. Ma, and K. Ngan entitled "Image Quality Assessment by Separately Evaluating Detail Losses and Additive Impairments"; variants and combinations of these metrics.

In embodiments, cost functions are used that express or estimate quality scores attributed to the client-side displayed visual datasets from human viewers.

In embodiments, the provided or estimated decoding device's display settings include at least one of the following: brightness, contrast, gamma correction, refresh rate, flickering (or filtering) settings, bit depth, color space, color format, spatial resolution, or back-lighting settings (if existing). In embodiments, the provided or estimated decoding device's power or energy-saving settings include at least one of the following: whether the device is plugged in an external power supply or is running on battery power, the battery power level, voltage or current levels measured or estimated while the device is decoding and displaying visual data, CPU or graphics processing unit(s) utilization levels, number of concurrent applications or execution threads running in the device's task manager or power manager.

In embodiments, the utilized encoding method provides a menu of encoded spatial resolutions and temporal resolutions of the input and optionally preprocessed visual data, with each resolution encoded at a range of bitrates using any standards-based or proprietary external encoder that can include any implementation of an ISO JPEG or ISO MPEG standard, or a proprietary or royalty-free encoder, such as, but not limited to, an AOMedia encoder.

In embodiments, corresponding sets of high-resolution and low-resolution visual data are provided to the server and the low-resolution version of the visual data is upscaled and optimized to improve and/or match quality or rate to the high resolution version.

In embodiments, the sets of high-resolution and low-resolution visual data are provided to the client instead of the server and the client carries out processing where the low-resolution version of the visual data is upscaled and optimized to improve and/or match quality or rate to the high resolution version.

In embodiments, the set of one or multiple encoded bitstreams corresponding to spatio-temporal resolutions and encoding bitrates for the visual data is placed in a manifest file or a list file that is shared between server and client.

In embodiments, the server or the client selects which subset to transmit based on a cost function or numerical estimate that minimizes the combination of at least one of: (i) the encoding bitrate; (ii) the decoded and displayed distortion or loss of visual fidelity as quantified by any of the metrics described herein; or (iii) the energy consumption to decode and display the visual data on the client side.

In embodiments, the minimization of the cost function is done subject to externally-set conditions for any of: the encoding bitrate, the decoded display or distortion, the energy consumption of the client that are not parts of the cost function.

In embodiments, one programmable computing unit or VLSI chip contains both a server and a client and they operate simultaneously to both send and receive visual data.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

REFERENCES

[1] F. Yu and V. Koltun, "Multi-scale context aggregation by dilated convolutions," arXiv preprint arXiv:1511.07122, 2015.

[2] I. Goodfellow, J. Pouget-Abadie, M. Mirza, B. Xu, D. Warde-Farley, S. Ozair, A. Courville and Y. Bengio, "Generative adversarial nets," in Advances in neural information processing systems, 2014.

[3] T. Salimans, I. Goodfellow, W. Zaremba, V. Cheung, A. Radford and X. Chen, "Improved techniques for training gans," in Advances in neural information processing systems, 2016.

[4] X. Mao, Q. Li, H. Xie, R. Y. K. Lau, Z. Wang and S. Paul Smolley, "Least squares generative adversarial networks," in Proceedings of the IEEE International Conference on Computer Vision, 2017.

[5] A. Jolicoeur-Martineau, "The relativistic discriminator: a key element missing from standard GAN," arXiv preprint arXiv:1807.00734, 2018.

[6] M. Arjovsky, S. Chintala and L. Bottou, "Wasserstein gan," arXiv preprint arXiv:1701.07875, 2017.

[7] I. Gulrajani, F. Ahmed, M. Ajovsky, V. Dumoulin and A. C. Courville, "Improved training of wasserstein gans," in Advances in neural information processing systems, 2017.

[8] Y. Mroueh and T. Sercu, "Fisher gan," in Advances in Neural Information Processing Systems, 2017.

[9] Boyce, Jill, et al. "Techniques for layered video encoding and decoding." U.S. patent application Ser. No. 13/738,138.

[10] Dar, Yehuda, and Alfred M. Bruckstein. "Improving low bit-rate video coding using spatio-temporal downscaling." arXiv preprint arXiv:1404.4026 (2014).

[11] Martemyanov, Alexey, et al. "Real-time video coding/decoding." U.S. Pat. No. 7,336,720. 26 Feb. 2008.

[12] van der Schaar, Mihaela, and Mahesh Balakrishnan. "Spatial scalability for fine granular video encoding." U.S. Pat. No. 6,836,512. 28 Dec. 2004.

[13] Hayashi et al., "Dimmer and video display device using the same", U.S. Pat. No. 10,078,236 B2, Date of patent: Sep. 18, 2018.

[14] Ato et al., "Display device," U.S. Pat. No. 9,791,701 B2, Date of patent: Oct. 17, 2017.

[15] Jung, "Liquid crystal display with brightness extractor and driving method thereof for modulating image brightness by controlling the average picture level to reduce glare and eye fatigue," U.S. Pat. No. 8,970,635 B2, Date of patent: Mar. 3, 2015.

[16] Varghese, Benoy, et al. "e-DASH: Modelling an energy-aware DASH player." 2017 IEEE 18th International Symposium on A World of Wireless, Proc. IEEE Mobile and Multimedia Networks (WoWMoM), 2017.

[17] Massouh, Nizar, et al. "Experimental study on luminance preprocessing for energy-aware HTTP-based mobile video streaming." Proc. IEEE 2014 5th European Workshop on Visual Information Processing (EUVIP).

[18] Hu, Wenjie, and Guohong Cao. "Energy-aware video streaming on smartphones." Proc. IEEE Conf. on Computer Communications (INFOCOM). IEEE, 2015.

[19] Almowuena, Saleh, et al. "Energy-aware and bandwidth-efficient hybrid video streaming over mobile networks." IEEE Trans. on Multimedia 18.1 (2015): 102-115.

[20] Mehrabi, Abbas, et al. "Energy-aware QoE and backhaul traffic optimization in green edge adaptive mobile video streaming." IEEE Trans. on Green Communications and Networking 3.3 (2019): 828-839.

[21] Dong, Jie, and Yan Ye. "Adaptive downsampling for high-definition video coding." IEEE Transactions on Circuits and Systems for Video Technology 24.3 (2014): 480-488.

[22] Douma, Peter, and Motoyuki Koike. "Method and apparatus for video upscaling." U.S. Pat. No. 8,165,197. 24 Apr. 2012.

[23] Su, Guan-Ming, et al. "Guided image up-sampling in video coding." U.S. Pat. No. 9,100,660. 4 Aug. 2015.

[24] Hinton, Geoffrey E., and Ruslan R. Salakhutdinov. "Reducing the dimensionality of data with neural networks." science 313.5786 (2006): 504-507.

[25] van den Oord, Aaron, et al. "Conditional image generation with pixelcnn decoders." Advances in Neural Information Processing Systems. 2016.
[26] Theis, Lucas, et al. "Lossy image compression with compressive autoencoders." arXiv preprint arXiv: 1703.00395(2017).
[27] Wu, Chao-Yuan, Nayan Singhal, and Philipp KrAhenbuhl. "Video Compression through Image Interpolation." arXiv preprint arXiv:1804.06919 (2018).
[28] Rippel, Oren, and Lubomir Bourdev. "Real-time adaptive image compression." arXiv preprint arXiv: 1705.05823 (2017).
[29] K. Suehring, HHI AVC reference code repository, online at the HHI website.
[30] G. Bjontegaard, "Calculation of average PSNR differences between RD-curves," VCEG-M33 (2001).

What is claimed is:

1. A computer-implemented method of processing image data at a server, the method comprising:
receiving, at a preprocessing network comprising a set of inter-connected learnable weights, image data from one or more images, wherein the set of inter-connected learnable weights of the preprocessing network are dependent upon one or more display settings of a display device, the one or more display settings comprising one or more dimming settings of the display device;
processing the image data using the preprocessing network to generate a plurality of output pixel representations, where different output pixel representations in the plurality of output pixel representations correspond to different display settings of the display device,
wherein the processing the image data using the preprocessing network comprises enhancing the image data, prior to encoding, to compensate for the one or more dimming settings of the display device;
encoding the plurality of output pixel representations to generate a plurality of encoded bitstreams; and
transmitting at least one selected encoded bitstream from the server to the display device, wherein the at least one selected encoded bitstream is selected from the plurality of encoded bitstreams based on the one or more display settings of the display device.

2. A method according to claim 1, wherein the one or more display settings are indicative of an energy-saving state of the display device.

3. A method according to claim 1, comprising encoding a given output pixel representation of the plurality of output pixel representations into both a first and a second encoded bitstream, wherein the first and the second encoded bitstreams correspond to different spatial and/or temporal resolutions and/or different bitrates.

4. A method according to claim 1, wherein the at least one selected encoded bitstream is selected based on information provided by the display device.

5. A method according to claim 1, comprising receiving, from the display device, display configuration data indicative of the one or more display settings.

6. A method according to claim 1, comprising sending a manifest file to the display device, the manifest file comprising information indicating the plurality of encoded bitstreams.

7. A method according to claim 1, wherein the one or more display settings are indicative of at least one of: whether the display device is plugged into an external power supply or is running on battery power; a battery power level of the display device; voltage or current levels measured or estimated while the display device is decoding and displaying image data; processor utilization levels of the display device; or a number of concurrent applications or execution threads running on the display device.

8. A method according to claim 1, wherein the one or more display settings comprise at least one of: brightness, contrast, gamma correction, refresh rate, flickering settings, bit depth, color space, color format, spatial resolution, or back-lighting settings of the display device.

9. A method according to claim 1, wherein the preprocessing network comprises an artificial neural network including multiple layers having a convolutional architecture, with each layer being configured to receive an output of one or more previous layers.

10. A method according to claim 1, wherein the processing the image data comprises using cost functions that estimate a fidelity of displayed image data at the display device to the received image data at the server, where the fidelity is estimated using one or more of:
an elementwise loss function, such as mean squared error, MSE;
a structural similarity index metric, SSIM; and
a visual information fidelity metric, VIF.

11. A method according to claim 1, wherein the processing the image data comprises using cost functions that estimate quality scores attributed to displayed image data at the display device from human viewers.

12. A computer-implemented method of processing image data at a display device, the method comprising:
receiving, from a server, information indicating a plurality of encoded bitstreams;
transmitting, to the server, data indicating a selection of at least one encoded bitstream from the plurality of encoded bitstreams, wherein the selection is performed based on one or more display settings of the display device, the one or more display settings comprising one or more dimming settings of the display device;
receiving the at least one selected encoded bitstream from the server;
decoding the at least one encoded bitstream to generate image data representing one or more images;
postprocessing, at a postprocessing network comprising a set of inter-connected learnable weights, the image data to obtain postprocessed image data, wherein the set of inter-connected learnable weights of the postprocessing network are dependent upon the one or more display settings of the display device,
wherein the postprocessing the image data at the postprocessing network comprises enhancing the image data to compensate for the one or more dimming settings of the display device; and
displaying the postprocessed image data in accordance with the one or more display settings of the display device.

13. A method according to claim 12, comprising transmitting, to the server, display configuration data indicative of the one or more display settings of the display device.

14. A computing device comprising:
a processor; and
a memory,
wherein the computing device is arranged to perform, using the processor, a method of processing image data comprising:
receiving, at a preprocessing network comprising a set of inter-connected learnable weights, image data from one or more images, wherein the set of inter-connected learnable weights of the preprocessing network are dependent upon one or more display settings of a display device, the one or more display settings comprising one or more dimming settings of the display device;

processing the image data using the preprocessing network to generate a plurality of output pixel representations, where different output pixel representations in the plurality of output pixel representations correspond to different display settings of the display device, wherein the processing the image data using the preprocessing network comprises enhancing the image data, prior to encoding, to compensate for the one or more dimming settings of the display device;

encoding the plurality of output pixel representations to generate a plurality of encoded bitstreams; and transmitting at least one selected encoded bitstream from the computing device to the display device, wherein the at least one selected encoded bitstream is selected from the plurality of encoded bitstreams based on the one or more display settings of the display device.

15. A non-transitory computer-readable medium comprising computer-executable instructions that, when executed by a processor of a computing device, cause the computing device to perform a method of processing image data, the method comprising:

receiving, at a preprocessing network comprising a set of inter-connected learnable weights, image data from one or more images, wherein the set of inter-connected learnable weights of the preprocessing network are dependent upon one or more display settings of a display device, the one or more display setting, comprising one or more dimming settings of the display device;

processing the image data using the preprocessing network to generate a plurality of output pixel representations, where different output pixel representations in the plurality of output pixel representations correspond to different display settings of the display device, wherein the processing the image data using the preprocessing network comprises enhancing the image data, prior to encoding, to compensate for the one or more dimming settings of the display device;

encoding the plurality of output pixel representations to generate a plurality of encoded bitstreams; and transmitting at least one selected encoded bitstream from computing device to the display device, wherein the at least one selected encoded bitstream is selected from the plurality of encoded bitstreams based on the one or more display settings of the display device.

* * * * *